June 19, 1934. F. MITTEAU 1,963,711
PROCESS FOR THE MANUFACTURE OF FERTILIZERS
Original Filed March 5, 1925
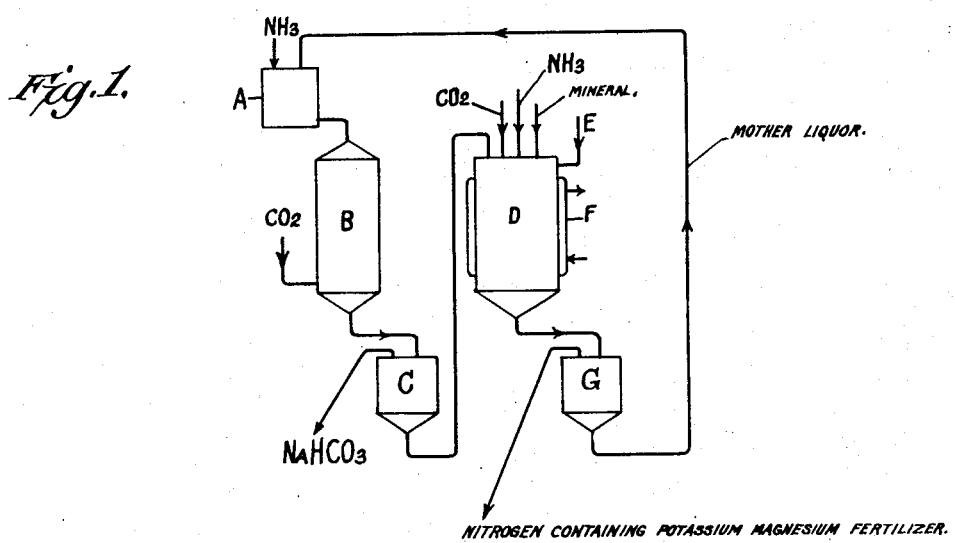
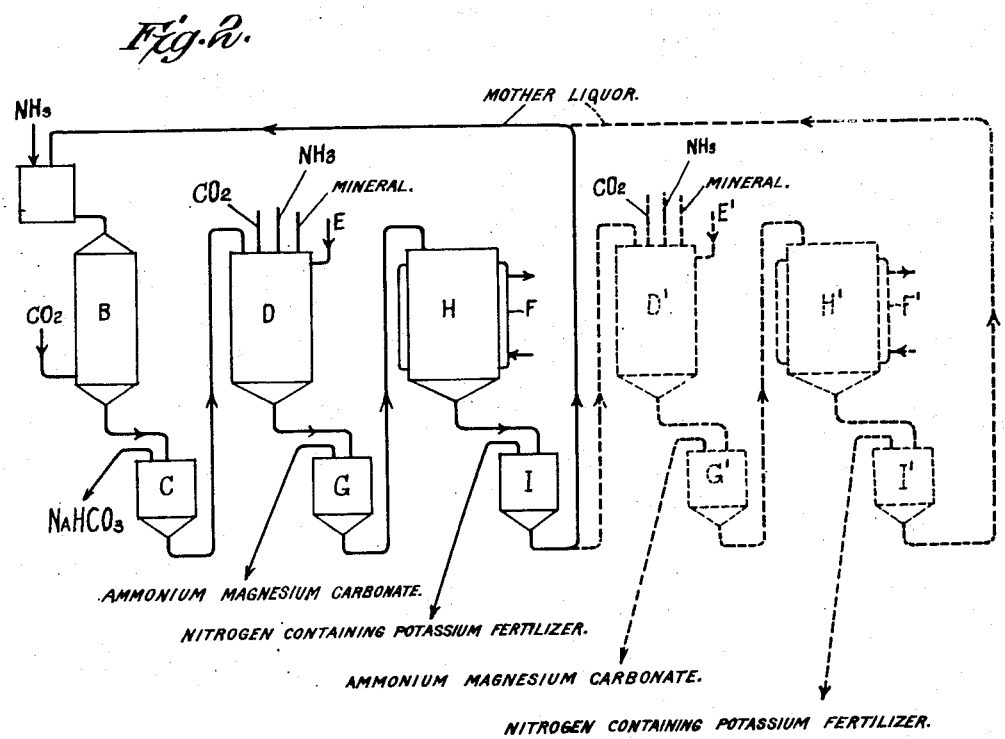

Patented June 19, 1934

1,963,711

UNITED STATES PATENT OFFICE

1,963,711

PROCESS FOR THE MANUFACTURE OF FERTILIZERS

Ferdinand Mitteau, Villemomble, France, assignor to L'Air Liquide, Societe Anonyme Pour L'Etude Et L'Exploitation Des Procedes Georges Claude, Paris, France Original application March 5, 1925, Serial No. 13,365. Divided and this application October 10, 1931, Serial No. 568,149. In France March 13, 1924

10 Claims. (Cl. 71—9)

This invention relates to improvements in the manufacture of fertilizers. A process is known which consists in employing sylvinite or a similar natural mineral under appropriate conditions in place of the sodium chloride which is employed in the well known reaction of ammonium bicarbonate and sodium chloride in the presence of water. The similar natural minerals of most interest are those which, like carnallite, kainite, schoenite, etc. contain magnesium in the form of sulphate and chloride, magnesium chloride being also present in small quantities in sylvinite. Examples of compositions of such natural minerals are given for instance in Daumer's "Handbuch der Chemischen Technologie" 1895, volume 1, pages 251 to 265. If desired, the magnesium can be eliminated prior to carrying out the treatment above referred to; the magnesium may however also be retained for the said treatment since it forms with the ammonium carbonate a double carbonate of magnesium and ammonium which is practically insoluble in the saline solutions and which separates along with the ammonium chloride when the liquor containing the mineral under treatment is cooled, and it is on a process of this nature in which the above described property of magnesium is utilized that the present invention is based.

The process according to the present invention consists in treating the mother liquor obtained as a result of the process, with carbon dioxide and ammonia so as to precipitate bicarbonate of soda and form at the same time ammonium chloride, then separating the precipitated bicarbonate of soda, then adding to the warm mother liquor the mineral to be treated, ammonia and carbon-dioxide in the requisite proportions, whereby the magnesium is precipitated in the form of ammonium magnesium carbonate, and thereafter, after separating the precipitated ammonium magnesium carbonate, cooling the liquor so as to precipitate therefrom potassium chloride, potassium sulphate, ammonium chloride, and ammonium sulphate. As well known to those skilled in the art, the requisite proportions above referred to are such that the solution, after addition of the ammonia and carbon dioxide, contains at least two moles of ammonium carbonate $(NH_4)_2CO_3$ for one mole of the magnesium compounds in the liquor.

In order that the invention may be clearly understood and readily carried into effect there will now be described various methods of carrying out the process for the production of different nitrogenous fertilizers containing potassium and magnesium either separately or together.

The first operation in the treatment is as follows:—

The cold mother liquors obtained at the end of the operations about to be described contain in solution, in addition to ammonium carbonate and sodium chloride, potassium salts and some ammonium chloride, but they are practically free from magnesium salts. To these mother liquors there is added ammonia in quantity dependent upon their content of sodium chloride, and they are then treated up to saturation with carbon dioxide. The greater part of the sodium chloride is thus converted into insoluble bicarbonate of soda, a corresponding proportion of ammonium chloride which remains dissolved in the mother liquors with the other salts being formed.

The second operation is as follows:—

After the separation and washing of the bicarbonate of soda there is added to the tepid mother liquor, while stirring, an amount of carnallite, or other similar mineral such that the quantity of sodium chloride introduced by this mineral is exactly equal to that which has been converted into bicarbonate of soda in the preceding stage of the operation. A current of gaseous ammonia and simultaneously a current of carbon-dioxide are then passed through the liquor, the temperature of which latter is allowed to rise, the temperature being finally brought up to 50° C. to 55° C.; in this way there are utilized both the heat of solution of the ammonia gas and also the heat of combination of the carbon-dioxide with the ammonia, so that eventually it is only necessary to add a small quantity of heat in order to complete the heating of the liquor so as to bring it to the temperature above indicated of from 50° C. to 55° C. Under these conditions the double ammonium magnesium carbonate, a large quantity of which is formed when carnallite and other similar magnesium-containing minerals are employed, is precipitated in such form that it can be easily filtered, contrary to what takes place in the cold. The admission of the gaseous ammonia and carbon-dioxide is stopped as soon as the filtered liquid is found to contain a sufficient excess of neutral ammonium carbonate.

Under these conditions the magnesium passes into the state of insoluble ammonium magnesium carbonate according to the following reactions:—

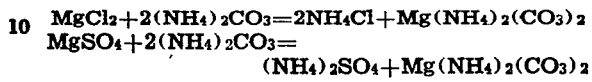

$MgCl_2 + 2(NH_4)_2CO_3 = 2NH_4Cl + Mg(NH_4)_2(CO_3)_2$
$MgSO_4 + 2(NH_4)_2CO_3 =$
$\quad (NH_4)_2SO_4 + Mg(NH_4)_2(CO_3)_2$ and it will be seen that the chlorine and the sulphuric acid liberated from the magnesium fix a certain quantity of nitrogen in the form of ammonium chloride and ammonium sulphate which dissolve in the hot liquid. The ammonium magnesium carbonate is then separated from the liquor. The separation should be effected while hot; then, on subsequently cooling, the ammonium chloride together with the ammonium sulphate are precipitated simultaneously with the potassium chloride and potassium sulphate. The remaining cold mother liquor, which is thus saturated in the cold either in ammonium chloride alone or in both ammonium chloride and ammonium sulphate, according to the added mineral containing only magnesium chloride or both magnesium chloride and magnesium sulphate, is utilized as already described for the commencement of the operations.

It will be seen that in this way two kinds of nitrogenous fertilizers can be obtained, namely:—

(1) A nitrogenous magnesium-containing fertilizer in concentrated form consisting of ammonium magnesium carbonate with a small quantity of potassium salts, and (2) A fertilizer consisting of a mixture of ammonium chloride, ammonium sulphate, potassium chloride and potassium sulphate and traces of sodium chloride.

The above fertilizers are no longer hygroscopic, as was the case with the initial minerals in consequence of the magnesium chloride contained in the said minerals.

If the mineral to be submitted to the treatment is poor in sodium chloride, for example if it only contains a proportion of sodium chloride below 25 per cent, the practical application of the two operations described above would lead to the necessity of adding to the warm mother liquors a too high proportion of the mineral in question. In such eventuality the stirring of the mass would become difficult and the complete solution of the sodium chloride would be jeopardized. In such a case as this, the addition of mineral is made in several stages in the following manner:—If for example, the quantity of the natural mineral to be added per cubic meter of mother liquors, so as to re-saturate the saline solutions with sodium chloride, amounts to 350 kilograms, then there is first added to the warm mother liquor the half of this quantity, namely 175 kilograms per cubic meter, and then the necessary ammonia and carbon-dioxide; after cooling, the fertilizer produced is separated in the manner previously described, and the same operation is repeated with the second half of the mineral on the new mother liquor. The mother liquor resulting from this second operation is afterwards treated with ammonia and carbon-dioxide to precipitate $NaHCO_3$ as already described at the commencement of the operations.

There is no limit moreover to the number of the successive treatments to which the mother liquors can thus be subjected before treating them for the production of bicarbonate of soda; as many treatments may be used as may be necessary in order to re-saturate the saline solution with sodium chloride.

The accompanying drawing illustrates diagrammatically two methods of carrying out the operations described above.

In the appended drawing, A indicates the receptacle containing the cold mother liquors obtained at the end of the aforesaid operations and to which ammonia is added if necessary. Carbon-dioxide is then added in the carbonating tower B up to saturation, and the resultant mass is then filtered in the hydro-extractor C, from which the bicarbonate of soda is removed.

The mother liquor separated at C is delivered to a receptacle D, to which the carnallite or other mineral, carbon-dioxide and ammonia are added, and to which a current of steam can also be supplied at E, if required, in order to raise the temperature of the mass to about 55° C. After the mass contained in receptacle D has been brought to a temperature of about 55° C., it is drained in the hydro-extractor G, from which latter the ammonium-magnesium carbonate is removed in a solid state, while the separated liquor is delivered to a receptacle H where it is cooled by circulating a stream of water through jacket F. The mass is discharged from receptacle H into a hydro-extractor I, from which the nitrogenous potassium fertilizer is removed while the filtered liquor is returned to receptacle A.

At the right-hand side of the figure there is illustrated in dotted lines a modified arrangement which is employed when the mineral used is poor in sodium chloride. In this case, the liquor separated in the hydro-extractor I is delivered to a receptacle D' similar to receptacle D, and is there treated in the same way with a certain quantity of mineral, carbon-dioxide and ammonia and heated to about 55° C. by the admission of steam. The ammonium-magnesium carbonate that forms is filtered in the hydro-extractor G' and the liquor separated out is delivered to a receptacle H' similar to receptacle H and provided with a cooling jacket F'. The nitrogenous potassium fertilizer obtained is filtered in the hydro-extractor I' and the separated cold liquor, which is saturated in the ammonium salts of the fertilizer, is returned to receptacle A.

It will be apparent that instead of employing only two treatments of the mineral as above described, as many as desired can be adopted by repeating the operations taking place at D' and H' until the final mother liquor has a sufficiently high content of sodium chloride to be delivered to the Solvay bicarbonating apparatus.

This application is divided from my patent application namely Serial No. 13,365 filed March 5, 1925.

I claim:—

1. A process for the manufacture of fertilizers, which comprises treating the mother liquor obtained as a result of the process and containing a substantial quantity of sodium chloride with carbon-dioxide and ammonia so as to precipitate sodium bicarbonate and simultaneously form ammonium chloride; separating the precipitated sodium bicarbonate; adding to the residual liquor ammonia, carbon-dioxide and a substance containing potassium and sodium chlorides and magnesium compounds, said substances being added in such proportions that the solution, after their addition, contains at least two moles of ammonium carbonate for one mole of magnesium compounds; bringing the temperature of the resultant mixture to about 55° C. to convert the ammonium-magnesium carbonate into an easily-filterable form; separating said carbonate; cooling the residual liquor; removing the crystalized salts; and returning the separated liquor to the process.

2. A process for the manufacture of fertilizers, which comprises treating the mother liquor obtained as a result of the process and containing a substantial quantity of sodium chloride with carbon-dioxide and ammonia so as to precipitate sodium bicarbonate and simultaneously form ammonium chloride; separating the precipitated sodium bicarbonate; adding to the residual liquor ammonia, carbon-dioxide and a solid mineral containing potassium and sodium chlorides and magnesium compounds, said substances being added in such proportions that the solution, after their addition, contains at least two moles of ammonium carbonate for one mole of magnesium compounds; bringing the temperature of the resultant mixture to about 55° C. to convert the ammonium-magnesium carbonate into an easily-filterable form; separating said carbonate; cooling the residual liquor; removing the crystallized salts; and returning the separated liquor to the process.

3. A process for the manufacture of fertilizers, which comprises treating the mother liquor obtained as a result of the process and containing a substantial quantity of sodium chloride with carbon dioxide and ammonia so as to precipitate sodium bicarbonate and simultaneously form ammonium chloride; separating the precipitated sodium bicarbonate; adding to the liquor ammonia, carbon dioxide and a substance containing potassium and sodium chlorides and magnesium compounds, said substances being added in such proportions that the solution, after their addition, contains at least two moles of ammonium carbonate for one mole of magnesium compounds; bringing the temperature of the resultant mixture to about 55° C. to convert the ammonium-magnesium carbonate into an easily-filterable form; separating said carbonate; cooling the liquor; removing the crystallized salts; again subjecting a number of times the remaining mother liquor to the succession of operations which consists in adding to said mother liquor ammonia, carbon dioxide and a substance containing potassium and sodium chlorides and magnesium compounds, bringing the temperature of the resulting mixture to about 55° C., separating the precipitated ammonium magnesium carbonate, cooling the liquor and removing crystallized salts; and then returning the solution to the process so as to again precipitate sodium bicarbonate.

4. A process for the manufacture of ammonium-magnesium carbonate and nitrogeneous fertilizers, which comprises treating the mother liquor obtained as a result of the process and saturated with ammonium salts in the cold with a magnesium salt-containing substance, ammonia and carbon-dioxide in such proportions that the solution contains at least two moles of ammonium carbonate for one mole of magnesium salts so as to precipitate ammonium magnesium carbonate in the heat; separating said carbonate; cooling the liquor to separate the nitrogenous fertilizer; and then returning the liquor to the process.

5. A process for the manufacture of ammonium magnesium carbonate and a fertilizer containing ammonium chloride, which comprises treating the mother liquor obtained as a result of the process and saturated with ammonium chloride in the cold with a magnesium chloride-containing substance, ammonia and carbon-dioxide in such proportions that the solution contains at least two moles of ammonium carbonate for one mole of magnesium chloride so as to precipitate ammonium-magnesium carbonate in the heat, separating said carbonate; cooling the liquor to separate the ammonium chloride-containing fertilizer; and then returning the liquor to the process.

6. A process for the manufacture of ammonium magnesium carbonate and a fertilizer containing ammonium sulphate, which comprises treating the mother liquor obtained as a result of the process and saturated with ammonium sulphate in the cold with a magnesium sulphate-containing substance, ammonia and carbon-dioxide in such proportions that the solution contains at least two moles of ammonium carbonate for one mole of magnesium sulphate so as to precipitate ammonium magnesium carbonate in the heat, separating said carbonate; cooling the liquor to separate the ammonium sulphate-containing fertilizer; and then returning the liquor to the process.

7. A process for the manufacture of ammonium-magnesium carbonate and ammonium salts, which comprises treating a liquor saturated with ammonium salts in the cold with a magnesium salt-containing substance, ammonia and carbon dioxide in such proportions that the liquor, after this treatment, contains at least two moles of ammonium carbonate for one mole of magnesium salts; removing the precipitated ammonium magnesium carbonate; and cooling the liquor to separate ammonium salts therefrom.

8. A process for the manufacture of fertilizers, which comprises treating the mother liquor obtained as a result of the process and containing a substantial quantity of sodium chloride with carbon dioxide and ammonia so as to precipitate sodium bicarbonate and simultaneously form ammonium chloride; separating the precipitated sodium bicarbonate; adding to the residual liquor ammonia, carbon dioxide and a substance containing potassium and sodium chlorides and magnesium compounds, said substances being added in such proportions that the solution, after their addition, contains at least two moles of ammonium carbonate for one mole of magnesium compounds; separating the precipitated ammonium-magnesium carbonate; cooling the residual liquor; removing the crystallized salts; and returning the separated liquor to the process.

9. A process for the manufacture of fertilizers, which comprises treating the mother liquor obtained as a result of the process and containing a substantial quantity of sodium chloride with carbon dioxide and ammonia so as to precipitate sodium bicarbonate and simultaneously form ammonium chloride; separating the precipitated sodium bicarbonate; adding to the residual liquor ammonia, carbon dioxide and a solid mineral containing potassium and sodium chlorides and magnesium compounds, said substances being added in such proportions that the solution, after their addition, contains at least two moles of ammonium carbonate for one mole of magnesium compounds; separating the precipitated ammonium-magnesium carbonate; cooling the residual liquor; removing the crystallized salts; and returning the separated liquor to the process.

10. A process for the manufacture of fertilizers, which comprises treating the mother liquor obtained as a result of the process and containing a substantial quantity of sodium chloride with carbon dioxide and ammonia so as to precipitate sodium bicarbonate and simultaneously form ammonium chloride; separating the precipitated sodium bicarbonate; adding to the liquor ammonia, carbon dioxide and a substance containing potassium and sodium chlorides and magnesium compounds, said substances being added in such proportions that the solution, after their addition, contains at least two moles of ammonium carbonate for one mole of magnesium compounds; separating the precipitated ammonium-magnesium carbonate; cooling the liquor; removing the crystallized salts; again subjecting a number of times the remaining mother liquor to the succession of operations which consists in adding to said mother liquor ammonia, carbon dioxide and a substance containing potassium and sodium chlorides and magnesium compounds, separating the precipitated ammonium magnesium carbonate, cooling the liquor and removing the crystallized salts; and then returning the solution to the process so as to again precipitate sodium bicarbonate.

FERDINAND MITTEAU.